Figure 1:
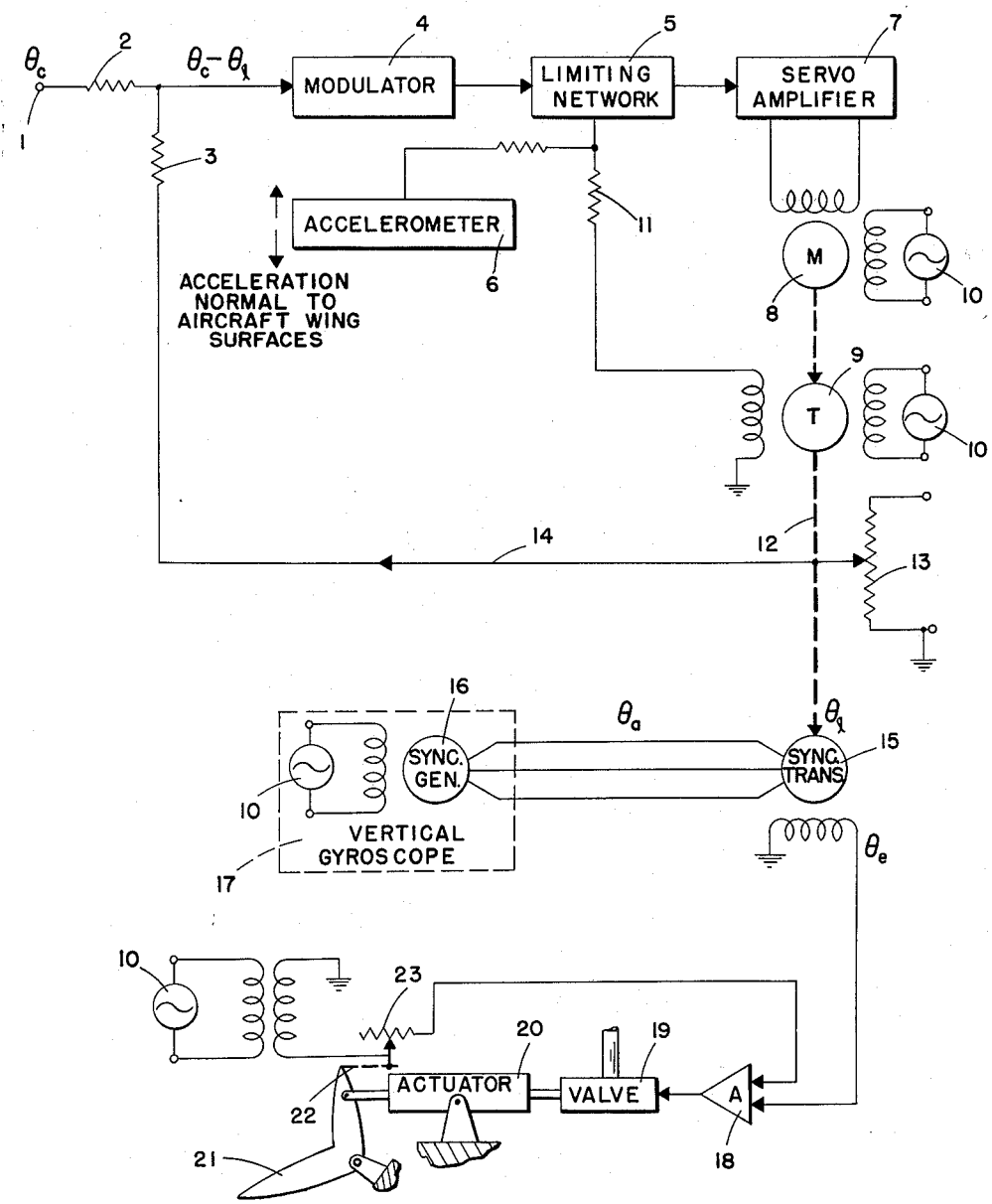

INVENTORS.
ROBERT W. BOND
THOMAS K. SHULER
BY
William R Lane
ATTORNEY

United States Patent Office 2,866,933
Patented Dec. 30, 1958

2,866,933

LIMITING DEVICE FOR AIRCRAFT WING LOAD

Robert W. Bond, Whittier, and Thomas K. Shuler, Long Beach, Calif., assignors to North American Aviation, Inc.

Application October 5, 1954, Serial No. 460,294

6 Claims. (Cl. 318—489)

This invention is an electronic circuit to prevent command signals from maneuvering an aircraft so as to impose excessive wing loads on the aircraft. More particularly, this device limits the command signals which control the pitching rate of the aircraft. The limiting is accomplished as a function of acceleration of the aircraft in a direction normal to the wing surfaces, termed "normal acceleration" herein.

Load factor is the ratio of instantaneous normal load on the wings in a given flight attitude to the normal load on the wings in level flight attitude. The sum of the normal acceleration of the center of gravity of the aircraft plus the earth acceleration of gravity, both expressed in g's, is numerically equal to the load factor. In the design of protective devices for aircraft, it is necessary to provide some means for limiting the load factor upon the wings when engaged in certain maneuvers. This is especially true in automatic pilot systems or radio command systems. Control systems are designed, in the first place, to operate reliably beyond the normal requirements. It is desirable, then, that the operation of these devices be limited by extrinsic means, such as the device of the invention, rather than by their own inherent capabilities.

Suppose an aircraft, by reason of pitch command signals, pulls into a loop which becomes tighter and tighter. Such a maneuver causes excessive wing loading. One solution to the limiting of excessive normal loads on the wings of an airframe may be utilizing a pitch control servo system into which is fed negative feedback signals from an accelerometer measuring acceleration normal to the wing surfaces. Suitable high gain feedback loops cannot be achieved in such a servo system without driving the system beyond stability. In order to eliminate the need of a servo system having a high gain feedback loop to control the airframe flight surfaces, a method of limiting the pitch command signal as a function of the acceleration, before it reaches the servo system, is utilized. An accelerometer located to measure the acceleration in a direction normal to the wing surfaces (which is also normal to the pitch angle) indicates wing loading. The command signal, then, ordering a certain pitch attitude is limited in its rate by the output of an accelerometer measuring acceleration normal to the lifting surfaces, or main wings, of the airframe. Rate of pitch attitude is defined as the pitching rate, or rate at which the pitch attitude is changing. It is apparent, then, that severe transient loads which flight instruments or automatic controls may attempt to place on the wings may be eliminated by the device of the invention.

It is an object, therefore, of this invention to provide a device sensitive to the wing loading on an aircraft.

It is a further object of this invention to provide a device designed to prevent excessive load factors on an aircraft.

It is still another object of this invention to provide a device which limits the flight command signal to an aircraft in accordance with the maximum desirable loads on an aircraft.

It is still another object of this invention to provide a device which limits the rate of change of pitch attitude in an aircraft in accordance with the acceleration of the aircraft.

Figure 2:
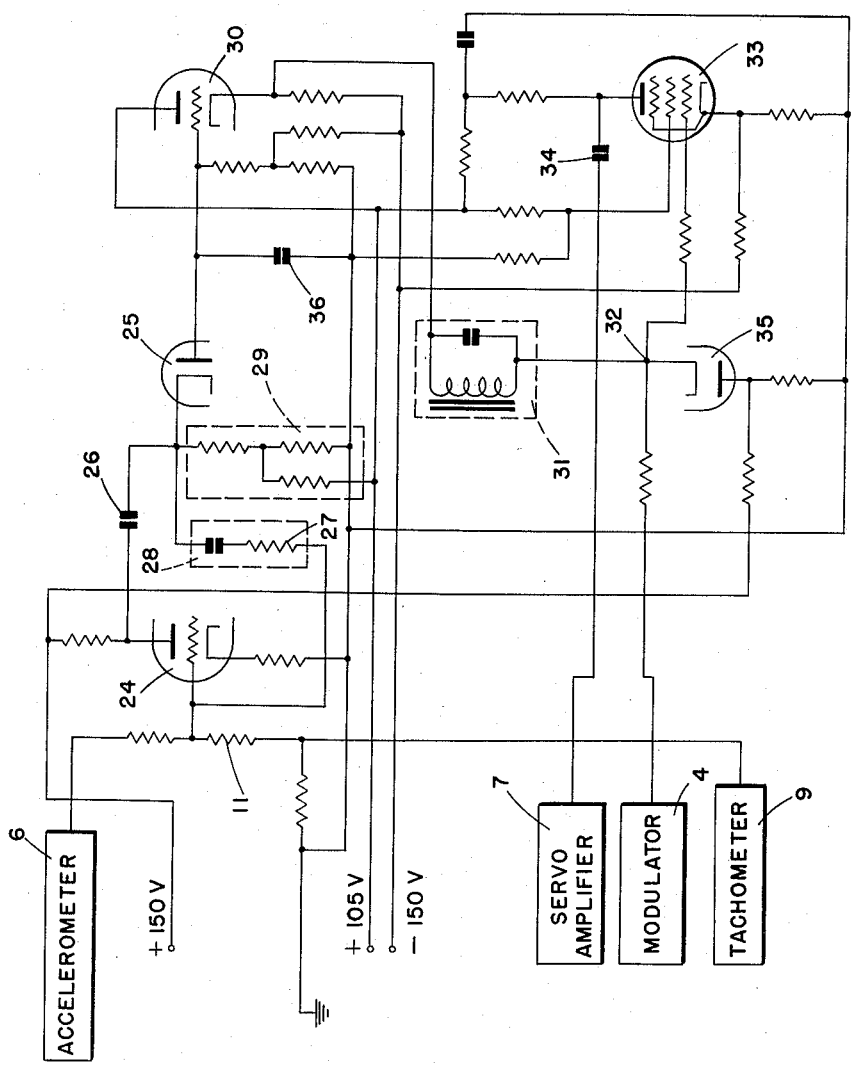

Other objects of invention will become apparent from the following description taken in connection with the accompanying drawings, in which Fig. 1 is an electrical diagram indicating a control system for an aerodynamic surface;

And Fig. 2 is an electrical schematic showing details of the load limiter of Fig. 1.

Referring now to Fig. 1, a D.-C. pitch command signal, $\theta_c$, is received at terminal 1 and passes through resistor 2 and is added to the signal received through resistor 3 and presented to modulator 4. Modulator 4 is an inverter which provides an A.-C. output whose amplitude varies according to the magnitude of the input D.-C. signal and whose phase varies according to the polarity of the input D.-C. signal. The pitch command signal $\theta_c$, then, indicates by its amplitude, the amount of pitch commanded and by its phase, the sense of pitch commanded, that is, whether it is up or down. Limiting network 5 limits the amplitude of the signal in accordance with the signal from accelerometer 6 plus the tachometer feedback signal through resistor 11. Servo amplifier 7 receives the signal and provides a phase reversible output whose magnitude varies in accordance with the output signal received from limiting network 5. Motor 8 rotates according to the output of servo amplifier 7. Tachometer 9 provides a rate feedback to limiter 5 through resistor 11 to limit the amplitude of rate of pitch command by indicating the rate at which shaft 12 is turning. Synchronized excitation of various devices in the schematic diagram is obtained from generator 10. The wiper of potentiometer 13 is adjusted by shaft 12 and provides closed loop servo control of the position of shaft 12 in accordance with line 14 which feeds back D.-C. to the junction between resistors 2 and 3 to be compared with the incoming D.-C. command signal. The input to modulator 4 is, therefore, an error signal which indicates the difference between the incoming pitch command signal, $\theta_c$, and the limited pitch command signal, $\theta_1$. The amplitude of this signal is limited, or controlled by limiting network 5. Shaft 12 turns the rotor of synchro transformer 15 which is excited by a synchro generator 16 of vertical gyroscope 17. Vertical gyroscope 17 provides a reference which indicates airframe pitch, $\theta_a$, with which limited pitch command signal, $\theta_1$, can be compared at this point. Synchro generator 16, therefore, provides a signal representing airframe pitch attitude. The output signal of synchro transformer 15, pitch error, $\theta_e$, is received at servo amplifier 18 which operates the control valve 19, to control hydraulic actuating cylinder 20 and pitch control surface 21 according to pitch error, $\theta_e$. In order to provide closed loop control of surface 21, mechanical linkage 22 drives the wiper of potentiometer pickoff 23 according to the position of surface 21. The pickoff signal is compared with $\theta_e$ at the input to amplifier 18.

A schematic diagram of a particular limiting device 5 is indicated in Fig. 2. Other types of controlled limiters are readily adaptable to this application. The one illustrated is, essentially, an amplifier whose gain is limited, or controlled, by the accelerometer and tachometer feedback. Accelerometer 6 is oriented so that its sensitive axes, as shown by the arrows, are directed normal to the wing surfaces so as to measure acceleration in the direction normal to the wing surfaces. Accelerometer 6 provides an amplitude modulated wave in accordance with acceleration, and a reversing phase when the direction of acceleration reverses. The accelerometer may be that kind illustrated in the patent to Nosker, issued January 11, 1944, No. 2,338,732, or may be the more conventional suspended mass type accelerometer with an E-type electromagnetic pickoff as described in Wittkuhns, issued August 8, 1933, No. 1,921,983. Suitable accelerometers having the previously mentioned characteristics are commercially available. The accelerometer signal is received at the grid of tube 24 together with the tachometer feedback signal received through resistor 11. The amplified output of tube 24 is fed to the cathode of diode 25 through blocking condenser 26. R-C combination 27 and 28 provides for negative feedback to stabilize, or hold more nearly constant, the gain at the operating frequencies. Resistor network 29 connecting the cathode of tube 25 to ground and a positive D.-C. source of 105 volts establishes a bias on the cathode which requires that the signal from tube 24 exceed a certain minimum value before any effect is had upon diode 25. Diode 25 provides half wave rectification of the output of tube 24. Condenser 36 filters out most of the harmonic content of diode 25 and applies the D.-C. component to the grid of tube 30. Tube 30 is operated in cathode-follower fashion and the D.-C. output is passed through L-C filter 31 which is tuned to reject the 400-cycle carrier frequency. When accelerometer 6 indicates excessive acceleration, the grid of tube 30 is biased more negatively. The output of tube 30, therefore, decreases. At junction 32, which is connected to the control grid of pentode 33, is received the pitch-angle information from modulator 4 (an A.-C. signal). The negative feedback signal from the accelerometer and tachometer fed to junction 32 through amplifier 24, diode 25, tube 30 and filter 31 is a D.-C. bias signal which controls the gain of amplifier pentode 33. Upon tube 30 decreasing in conduction, as previously explained, it reduces the potential at point 32 and the voltage on the control grid of tube 33 is also reduced. High acceleration or high rate of pitch attitude reduces, therefore, the gain of amplifier 33. In this manner, not only is the pitch angle signal limited in its rate by the tachometer feedback but it is also limited as a function of the normal acceleration. The output of tube 33 through capacitor 34 is pitch angle information limited by the accelerometer and the tachometer. This output signal is further amplified by servo amplifier 7 and drives servo motor 8, Fig. 1, as described previously. In summary, the shaft of synchro control transformer 15 (whose position is termed $\theta_1$) is, therefore, limited in its angular rate by the normal acceleration of the aircraft. This prevents further increase of the signal to the control surface. Diode 35, Fig. 2, provides a limiting action on the negative swing of the input signal to the control grid of tube 33.

It has been determined that the accelerometer should be mounted well ahead of the center of gravity of the airframe. In some instances, depending on the particular aircraft, the accelerometer may be mounted as far forward as practicable. In this way, the accelerometer provides a reading which includes a certain amount of anticipation of acceleration which further aids in keeping the load factor within limits.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In a device for limiting aircraft wing loads, an amplifier adapted to receive a signal whose amplitude indicates pitch command and whose phase indicates sense, an accelerometer whose sensitive axis is oriented to measure normal acceleration, and whose amplitude indicates the amount of normal acceleration and whose phase indicates sense, the output of said accelerometer connected to control the gain of said amplifier whereby said pitch command signals are limited in their amplitude.

2. In a device for limiting aircraft wing loads, an amplifier adapted to receive a signal whose amplitude indicates pitch command and whose phase indicates sense, an accelerometer whose sensitive axis is oriented to measure normal acceleration and whose amplitude indicates the amount of normal acceleration and whose phase indicates sense, means for determining the rate of change of said pitch command signal, said latter means and said accelerometer connected to control the gain of said amplifier whereby said pitch command signals are limited in their amplitude according to normal acceleration and rate of change of pitch attitude.

3. In a device for limiting aircraft wing loads, an amplifier adapted to receive an A.-C. signal whose amplitude indicates pitch command and whose phase indicates sense, an accelerometer whose sensitive axis is oriented in a direction to measure normal acceleration and whose amplitude indicates the amount of normal acceleration and whose phase indicates sense, rectifying means connected to receive the output of said accelerometer and to control the gain of said amplifier in response to the signal from said accelerometer.

4. In a device for limiting aircraft wing loads, an amplifier adapted to receive an A.-C. signal whose amplitude indicates pitch command and whose phase indicates sense, an accelerometer whose sensitive axis is oriented in a direction to measure normal acceleration and whose amplitude indicates the amount of normal acceleration and whose phase indicates sense, means indicating the rate of change of the output of said amplifier, means for rectifying the output of said rate indicating means and said accelerometer, said rectifying means connected to control the gain of said amplifier in response to the output of said rate indicating means and said accelerometer.

5. In a device for limiting aircraft wing loads, a gain controlled A.-C. amplifier adapted to receive an A.-C. signal whose amplitude indicates pitch command and whose phase indicates sense, an accelerometer whose sensitive axis is oriented in a direction to measure normal acceleration and whose amplitude indicates the amount of normal acceleration and whose phase indicates sense, a servo amplifier connected to receive the output of said A.-C. amplifier, a servo motor connected to receive the output of said servo amplifier, rate indicating means connected to be rotated by said motor, rectifying means connected to receive the output of said rate indicating means and said accelerometer, said rectifying means connected to control the gain of said A.-C. amplifier.

6. In a device for limiting aircraft wing loads, a modulator adapted to receive a D.-C. signal whose magnitude indicates pitch command and whose polarity indicates sense, said modulator providing an A.-C. output signal varying in amplitude according to said D.-C. signal and in phase according to the polarity of said D.-C. signal, and A.-C. amplifier connected to receive the output of said modulator, an accelerometer whose sensitive axis is oriented in a direction to measure normal acceleration and whose amplitude indicates the amount of normal acceleration and whose phase indicates sense, a servo amplifier connected to receive the output of said A.-C. amplifier, a servo motor connected to receive the output of said servo amplifier, rate indicating means driven by said motor, rectifying means connected to receive the output of said rate indicating means and said accelerometer, said rectifying means connected to control the gain of said A.-C. amplifier, position indicating means driven by said motor, means for providing a D.-C. voltage according to said position indicating means, means for inversely feeding back said D.-C. voltage to the input of said modulator, whereby the difference between said input command signal and the positional feedback signal is an error signal to said modulator.

References Cited in the file of this patent

UNITED STATES PATENTS

| | | |
|---|---|---|
| 2,553,546 | Brannin | May 22, 1951 |
| 2,553,560 | Esval | May 22, 1951 |
| 2,595,309 | Slater | May 6, 1952 |
| 2,659,041 | Kutzler | Nov. 10, 1953 |